Jan. 26, 1932.　　　C. B. MATZ　　　1,842,417
STUFFING APPARATUS
Filed Sept. 21, 1928　　2 Sheets-Sheet 2
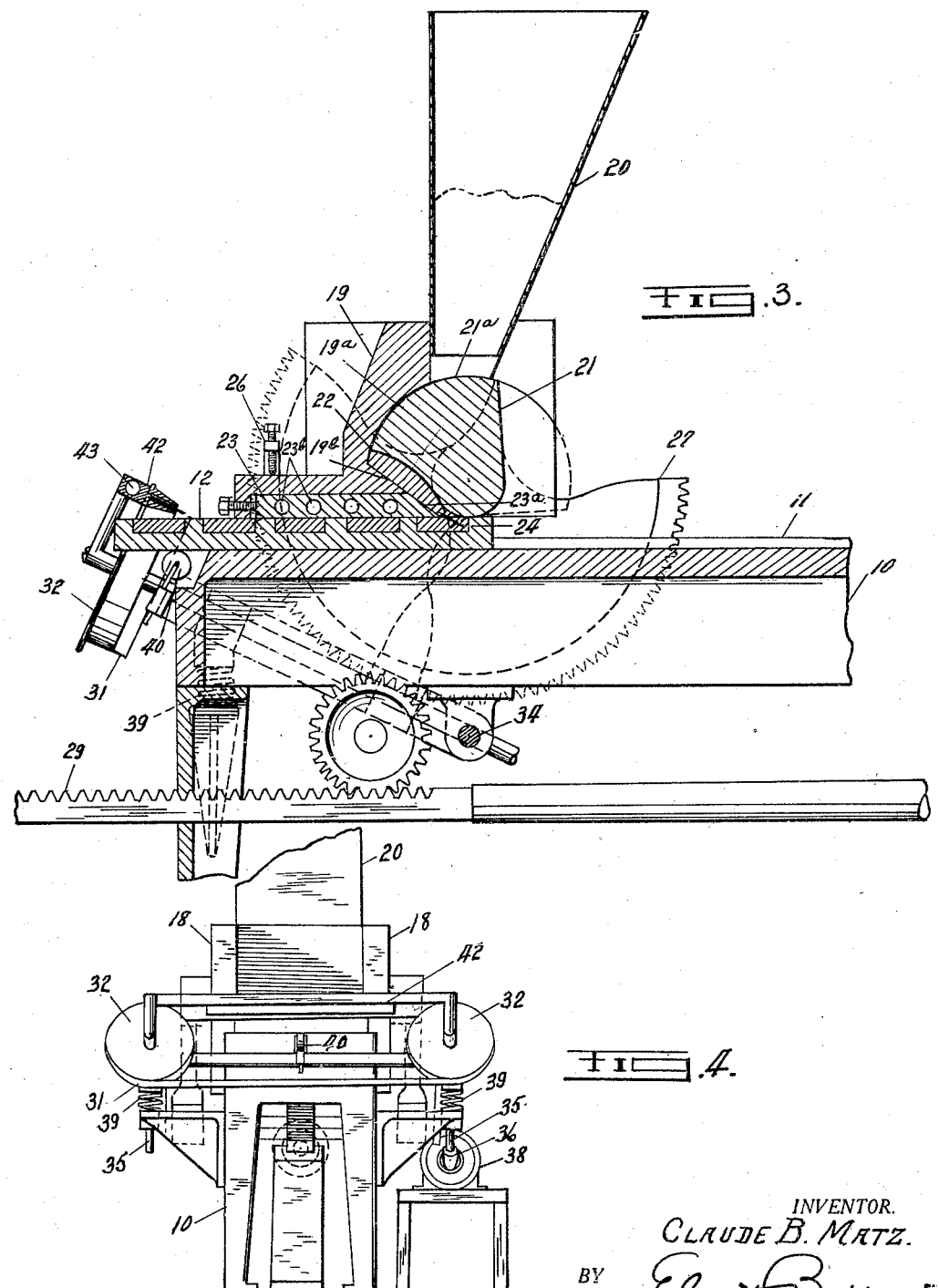
INVENTOR.
CLAUDE B. MATZ.
BY
Ely Barrow
ATTORNEYS.

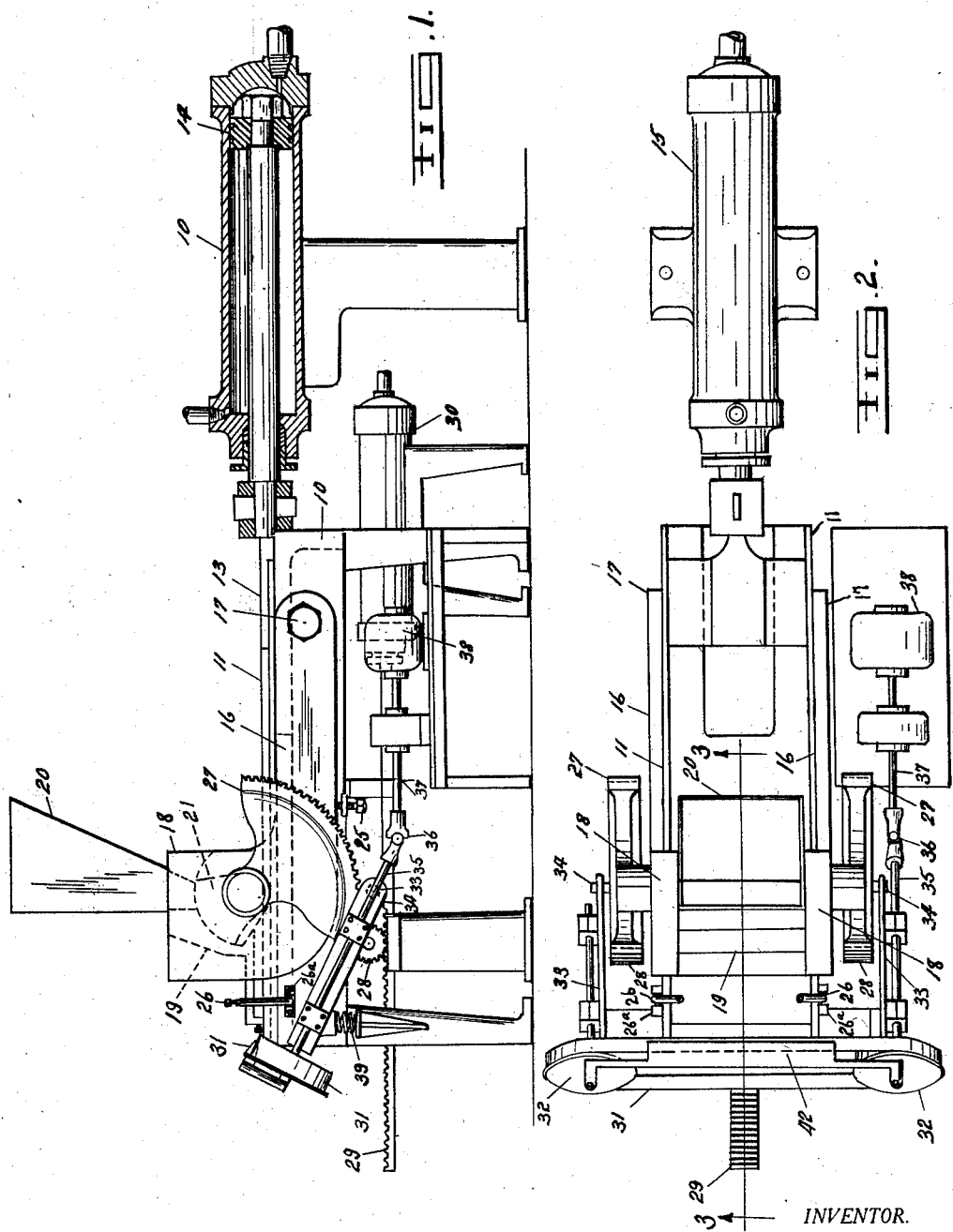

Patented Jan. 26, 1932

1,842,417

UNITED STATES PATENT OFFICE

CLAUDE B. MATZ, OF AKRON, OHIO

STUFFING APPARATUS

Application filed September 21, 1928. Serial No. 307,407.

This invention relates to stuffing apparatus and particularly to apparatus for filling molds with rubber.

It has heretofore been the practice to fill molds, such as rubber heel molds, in a stuffing apparatus, but such apparatus as has been used for this purpose has not been entirely satisfactory for the reason that the consistency of the stock varies, due to various causes such as weather changes, and results in improperly filled molds.

It is an object of the present invention to provide a stuffing apparatus such as may be used for filling molds and which is operable effectively under all conditions of the stock.

A further object of the invention is to provide in combination with a mold stuffing apparatus, a device for leveling off the material in the molds after they have been relieved from the stuffing pressure.

The foregoing and other objects of the invention are attained in the apparatus illustrated in the accompanying drawings and described below. It is to be understood, however, that the invention is not limited to the particular embodiment thereof shown and described.

Of the accompanying drawings,

Figure 1 is a side elevation, partly in section, of apparatus embodying the invention;

Figure 2 is a plan thereof;

Figure 3 is an enlarged section on line 3—3 of Figure 2; and

Figure 4 is a left end elevation thereof.

Referring to the drawings, the numeral 10 designates a suitable support or table provided with longitudinal guides 11, 11 on the top thereof for receiving heel mold plates indicated at 12 and guiding them under a stuffing device to be described, arranged over the table. A reciprocable plunger 13 is arranged to push the molds under the stuffing device, plunger 13 being operable by suitable means such as a piston 14 in a fluid pressure cylinder 15.

The stuffing apparatus comprising a unit including arms 16 which are pivoted upon the sides of table 10 as indicated at 17 and side plates 18, 18 spanned by a rear wall at 19 and supporting a hopper 20 for delivering rubber between walls 18. A stuffing element 21 is journaled between said side plates so as to swing across the bottom of hopper 20 and is formed with a shearing edge 22 for cutting off a portion of rubber extending down between plates 18 from the bottom of hopper 20, the inner side of wall 19 being formed with an arcuate surface 19$^a$ and the element 21 with an arcuate surface arranged to cooperate with each other to confine the rubber thus cut from the bottom of hopper 20 between member 21 and a forwardly extending downwardly tapered surface 19$^b$ on the inside of wall 19. Wall 19 is preferably provided with a separate brass wear plate 23 on the bottom thereof with its front end beveled at 23$^a$ to become in effect an extension of surface 19$^b$ and adjustable toward and from member 21 to provide an outlet from the stuffer at 24 which is directed oppositely to the movement of the molds 12 over table 10 and is adjustable as to size to compensate for variations in the consistency of the stock. The plate 23 is preferably adapted to be heated as by provision of steam passages 23$^b$, 23$^b$ therein.

When not in operation, the stuffing unit is held in a position slightly below that in which it rests on the molds by set screws 25, 25 engaging under arms 16 and in order to prevent it from being lifted off the molds by the high pressure in the stock, set screws 26, 26 are arranged to engage with a rearwardly extending portion of wall 19, said set screws being mounted on pivoted brackets 26$^a$ adapted to be swung out of the way when it is desired to raise the stuffing unit off the table.

For actuating the stuffing element, sector gears 27, 27 may be secured thereto and pinions 28, 28 meshed therewith may be arranged to be driven in either direction by a rack 29 operable by a double acting fluid pressure cylinder 30 having a suitable hand valve control (not shown).

For leveling off the contents of the molds as they issue from the stuffer, a trimming knife, preferably in the form of a continuously driven heated endless band 31, is employed. This band knife is mounted over pulleys 32, 32 on arms 33, 33 pivoted at 34, 34 and adapted to support the knife at an inclination to the mold surface as shown. One of the pulleys 32 may be driven by a shaft 35 which, in turn, is driven through a flexible connection 36 by a shaft 37 rotatable by a motor 38 or other suitable power means.

The knife 31 is normally held slightly above operative position as by springs 39, 39 engaging under arms 33 and is adapted to be actuated into engagement with the mold surfaces by passage of the molds through the machine as by means of a roller 40 connected to the knife unit and arranged in a slot 41 in table 10 to be depressed by passage of the molds thereover. The knife is guided in its movement across the molds in a grooved bar 42 arranged to be heated in any suitable way as by a steam passage 43.

In operation, the molds to be filled are supplied on table 10 to the rear of plunger 13. Milled rubber stock in a roll as it comes from the warming mill is inserted in hopper 20, element 21 at the start being in the dotted line position shown. The stuffing element is swung forwardly as the molds are pushed beneath the stuffer by actuating of the plunger and the rubber is forced downwardly and forwardly out of the stuffer in a direction opposite to that in which the molds pass therethrough, the opening from the stuffer being so adjusted and the heat of the stock being so controlled at the opening as to secure effective filling of the molds under all conditions. The stuffer rests upon the surfaces of the molds by gravity and is held by the hinge or pivotal connection, the molds passing through, tending to draw the unit forwardly and prevent chattering of the unit and the unit compensating for variations in the thicknesses of the molds. The plate 23 riding on the mold surfaces serves effectively to confine the rubber to the cavities therein. As the molds pass from the stuffer, the heated leveling or trimming knife 31 removes any excess rubber.

The quantity of rubber removed from that projecting below the hopper 20 being used up, the element 21 is swung in the reverse direction, the rubber in the hopper dropping down in front of it, and the element is again actuated forwardly. The stuffer is preferably so dimensioned as to fill a given number of molds upon each operation thereof so that the molds are preferably passed through the machine in sets of a certain number.

It is to be noted that the stuffing unit may be swung up out of the way when desired or necessary, and also that it can easily be adjusted to fill molds of different depths.

Modifications of the invention may be resorted to without departing from the spirit thereof or the scope of the appended claims.

What is claimed is:—

1. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, means for adjusting the size of the outlet and means for heating the outlet, and means for removing excess plastic material from the molds as they pass from the stuffer, said means comprising a traveling knife normally elevated from operative position, means operable by passage of the molds from the stuffer to lower the knife into operative position on the molds and means for heating the knife.

2. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder and means for adjusting the size of the outlet, and means for removing excess plastic material from the molds as they pass from the stuffer, said means comprising a traveling knife normally elevated from operative position, means operable by passage of the molds from the stuffer to lower the knife into operative position on the molds and means for heating the knife.

3. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, means for adjusting the size of the outlet and means for heating the outlet, and means for removing excess plastic material from the molds as they pass from the stuffer, said means comprising a traveling knife normally elevated from operative position and means operable by passage of the mold from the stuffer to lower the knife into operative position on the molds.

4. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder and means for adjusting the size of the outlet, and means for removing excess plastic material from the molds as they pass from the stuffer, said means comprising a traveling knife normally elevated from operative position and means operable by passage of the molds from the stuffer to lower the knife into operative position on the molds.

5. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, means for adjusting the size of the outlet and means for heating the outlet, and means for removing the excess plastic material from the molds as they pass from the stuffer.

6. An apparatus for stuffing molds with plastic material comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder and means for adjusting the size of the outlet, and means for removing excess plastic material from the molds as they pass from the stuffer.

7. Apparatus for stuffing molds with plastic material comprising a support over which the molds may be passed, and a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, means for adjusting the size of the outlet and means for heating the outlet.

8. An apparatus for stuffing molds with plastic material comprising a support over which the molds may be passed, and a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder and means for adjusting the size of the outlet.

9. An apparatus for stuffing molds with plastic material comprising a support over which the molds may be passed, and a stuffing unit pivotally mounted over the support to rest on the molds, said unit comprising a hopper, a stuffing element adapted to swing across the bottom the hopper and means with which the stuffing element cooperates to define a chamber in which the plastic material is confined by said stuffing element, said chamber having an outlet therefrom directed downwardly and opposite to the direction in which the molds pass thereunder.

10. An apparatus for stuffing molds with plastic material, comprising a support over which the molds may be passed, a stuffing unit pivotally mounted over the support to rest on the molds, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, and means for removing excess plastic material from the molds as they pass from the stuffer.

11. An apparatus for stuffing molds with plastic material comprising a support over which the molds may be passed, and a stuffing unit mounted over the support, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder.

12. An apparatus for stuffing molds with plastic material comprising a support over which the molds may be passed, a stuffing unit mounted over the support, said unit comprising a hopper, a stuffing element adapted to swing across the bottom of the hopper and means with which the stuffing element cooperates to define a chamber in which the plastic material is confined by said stuffing element, said chamber having an outlet therefrom directed downwardly and opposite to the direction in which the molds pass thereunder, and means for removing excess plastic material from the molds as they pass from the stuffer.

13. A stuffing apparatus for plastic material comprising a hopper to receive the material, a stuffing element movable arcuately across the bottom of the hopper to cut off the portion of material projecting below the hopper, and means with which the element cooperates to define a chamber in which the material is confined by the stuffing element and extruded therefrom, said chamber having a downwardly and rearwardly directed material extruding outlet passage, said means including an adjustable member for varying the size of the outlet.

14. A stuffing apparatus for plastic material comprising a hopper to receive the material, a stuffing element movable arcuately across the bottom of the hopper to cut off the portion of material projecting below the hopper, and means with which the element cooperates to define a chamber in which the material is confined by the stuffing element and extruded therefrom, said chamber having a downwardly and rearwardly directed material extruding outlet passage.

15. A stuffing apparatus for plastic material comprising a hopper to receive the material, a stuffing element movable arcuately across the bottom of the hopper to cut off the portion of material projecting below the hopper, and means with which the element cooperates to define a chamber in which the material is confined by the stuffing element and extruded therefrom, said chamber having an outlet in the bottom thereof from which the material is extruded.

16. The combination with a mold stuffing apparatus of means for passing the molds therethrough, a traveling leveling knife operable on the molds, said knife being normally elevated from operative position, and means operable by passage of the molds for lowering the knife into operative engagement therewith.

17. The combination with an apparatus for stuffing molds with rubber and means for passing the molds through the apparatus, of a mold leveling knife traveling transversely of the path of the molds and operable on the surfaces of the molds as they pass from the apparatus, and means for heating said knife.

18. In a stuffing apparatus, a hopper for receiving a batch of plastic material, and stuffing means comprising a stuffing element movable across the bottom of the hopper to cut a portion of the material from the batch at each operation of the element and means cooperating with the element to define a chamber in which the plastic material cut from the batch is confined by the stuffing element, said stuffing element and said means cooperating also to define an extruding passageway.

19. The combination with means for passing a series of molds along a path of an extruding device for stuffing said molds, said device having an extruding outlet, means for varying the size of said outlet, and a knife traveling transversely of the path of the molds for trimming excess rubber away from the tops of the molds.

20. The combination in a mold stuffing apparatus of means for feeding molds along a path, and means for extruding plastic material into the molds, said means extruding the material at an angle to the path of the molds in a direction opposite to the travel thereof.

21. The combination with an apparatus for stuffing molds with rubber and means for passing the molds through the apparatus, of a mold leveling knife traveling transversely of the path of the molds and operable on the surfaces of the molds as they pass from the apparatus.

CLAUDE B. MATZ.